United States Patent [19]

Valdsaar

[11] 4,076,506

[45] Feb. 28, 1978

[54] TRANSITION METAL CARBIDE AND BORIDE ABRASIVE PARTICLES

[75] Inventor: Herbert Valdsaar, Wilmington, Del.

[73] Assignee: E. I. Du Pont de Nemours and Company, Wilmington, Del.

[21] Appl. No.: 728,414

[22] Filed: Sep. 30, 1976

Related U.S. Application Data

[63] Continuation-in-part of Ser. No. 621,821, Oct. 14, 1975, abandoned.

[51] Int. Cl.² ............... B24D 3/02; C04B 31/16; C09C 1/68
[52] U.S. Cl. ............................ 51/307; 51/298 R; 51/308; 51/309 R; 106/43; 106/56; 106/65
[58] Field of Search ............ 106/43, 57, 65; 51/307, 51/308, 298, 309

[56] References Cited

U.S. PATENT DOCUMENTS

| | | | |
|---|---|---|---|
| 2,090,274 | 8/1937 | Walker et al. | 51/307 |
| 2,814,566 | 11/1957 | Glaser | 106/43 |
| 3,340,076 | 9/1967 | Alper et al. | 106/43 |
| 3,340,077 | 9/1967 | Alper et al. | 106/43 |

*Primary Examiner*—Donald J. Arnold

[57] ABSTRACT

This invention relates to abrasive particles and process for their preparation. The particles consist essentially of a matrix of titanium carbide and zirconium carbide, at least partially in solid solution form and grains of crystalline titanium diboride dispersed throughout the carbide matrix. These abrasive particles are particularly useful as components of grinding wheels for abrading steel.

14 Claims, 1 Drawing Figure

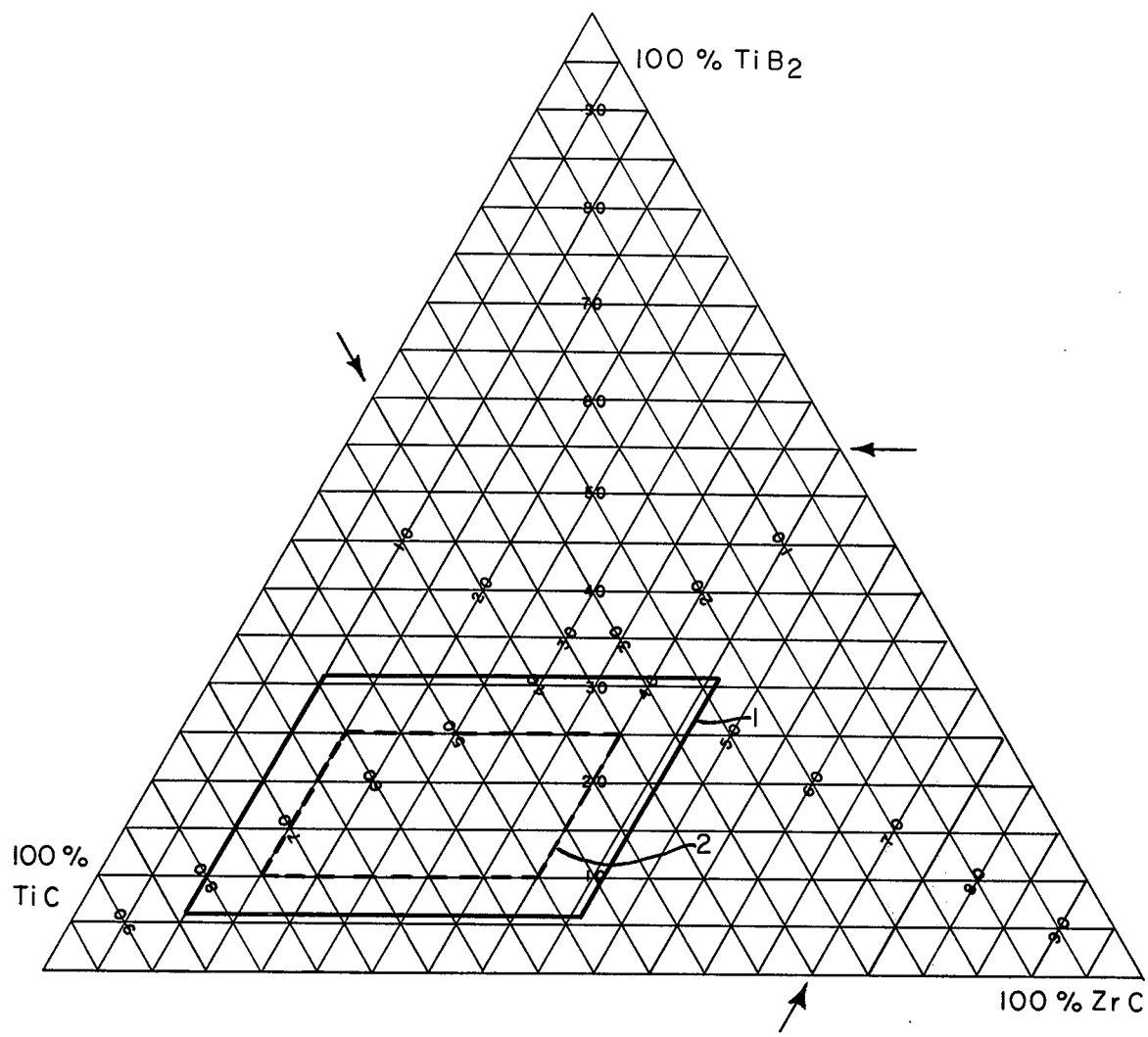

TRANSITION METAL CARBIDE AND BORIDE ABRASIVE PARTICLES

CROSS REFERENCE TO RELATED APPLICATION

This application is a continuation-in-part of my application Ser. No. 621,821, filed Oct. 14, 1975 and now abandoned.

BACKGROUND OF THE INVENTION

This invention relates to abrasive particles consisting essentially of titanium carbide, zirconium carbide and titanium diboride and a process for producing these particles.

Abrasive particles are incorporated into grinding wheels, cutting wheels and abrasive belts to grind or cut metals and other hard materials. Such wheels, belts and the like are judged by their ability to grind or cut rapidly with a minimum of applied force, with long service life and with the ability to produce a smooth, uniform surface with a minimum of structural damage. Desirable performance of these wheels, belts and the like are attributed to the abrasive particle which must possess great hardness and chemical inertness toward the material being ground, but other factors are also important as will be discussed below. The conventional abrasive particles of the trade are aluminum oxide and silicon carbide. These materials are inexpensive, but in the case of aluminum oxide, wear out rapidly or, in the case of silicon carbide, react when used on most steels. For certain applications expensive high performance abrasive particles such as diamond and cubic boron nitride are used. These materials have a very long service life, i.e., wear out very slowly but cost approximately ten thousand times more than conventional abrasives.

It is an object of this invention to provide abrasive particles which give performance approaching that of diamond and cubic boron nitride at a lesser cost.

Transition metal carbides, well-known for their great hardness and high melting points, are widely used in commercial applications such as cutting tools and dies, usually with a ductile metal binder. Although these carbides have great hardness and high melting points, repeated attempts to use them as abrasives have shown that they do not compete successfully with conventional abrasives such as aluminum oxide, particularly in the grinding of ferrous metals (L. Coes, Jr., Abrasives, Springer-Verlag, New York - Wien, 1971, pp. 114–116 and NSF Hard Materials Research, Volume 1, page 92, Carnegie-Mellon University Section, Pennsylvania State University 1972).

Some improvements in the physical properties, particularly heat conductivity and toughness of transition metal carbide composites used for cutting tools and wear resistant surfaces, have been achieved by combining one or more transition metal carbides with boron or transition metal borides as described in Glaser U.S. Pat. Nos. 2,806,800 and 2,814,566, Williams U.S. Pat. No. 3,497,368 and Schedler Austrian Pat. No. 199,886. These improvements are generally directed to cutting tool applications where hardness to resist abrasive wear and very high toughness to resist shock loading are required. Cutting tool art has shown that these properties are optimized by fine microstructural grain size (0.1$\mu$m or less). On the other hand, an abrasive particle having the grinding characteristics of a high performance abrasive, specifically sharpness and long life, requires a combination of hardness with moderate toughness. The abrasive particle will have long-lived sharp cutting edges that predictably break down by fracture to give fresh cutting edges rather than rounded ones. If the toughness is too low, the particle is brittle and breaks down too quickly in abrasive use. Examples of this are pure titanium carbide and zirconium carbide which are hard but wear too fast. Essentially an abrasive particle must be friable to a certain controlled degree, a property of a very limited range of hard chemical compositions and apparently also promoted by a relatively coarse grain structure. The major chemical constituents of the abrasive particles should be nonreactive at the grinding temperature with the metals being ground. Thus while the above patents describe composites of a very wide range of transition metal carbides and borides including those of titanium, molybdenum, tungsten, iron, manganese, chromium and silicon, they in no way teach the limited range of compositions or the process techniques required to produce the high performance abrasive of this invention.

The objective of this invention is met by abrasive particles which consist essentially of a mixed carbide matrix of titanium carbide and zirconium carbide, at least partially in solid solution form and having a crystalline or grain size of about 2 to 30$\mu$m, and crystals of titanium diboride, 0.5$\mu$m to 30$\mu$m in size, dispersed throughout the carbide matrix.

It will be understood that the presence or absence of solid phases is as determined by X-ray diffraction.

SUMMARY OF THE INVENTION

This invention is directed to abrasive particles consisting essentially of titanium diboride (TiB$_2$) crystals in a carbide matrix of titanium carbide (TiC) and zirconium carbide (ZrC). The carbide matrix constitutes approximately 69 to 94%, and the titanium diboride constitutes approximately 31 to 6% of the total weight of the titanium and zirconium carbides and borides present. At least a part of the carbide matrix is in the form of one or more solid solutions of zirconium carbide and titanium carbide and contains from 10 to 46% of zirconium carbide, based on the total weight of titanium and zirconium carbides and borides present. In addition to the titanium and zirconium carbides and borides, the abrasive particles may contain other materials in amounts up to 20% of the total weight of the abrasive particles.

In the preferred abrasive particles of this invention, the carbide matrix constitutes from 75 to 90% and titanium diboride constitutes from 25 to 10% of the titanium and zirconium carbides and borides present, while the zirconium carbide content is from 15 to 40%, based on the total weight of titanium and zirconium carbides and borides present.

The abrasive particles of this invention are prepared by thoroughly mixing zirconium diboride (ZrB$_2$) and TiC, said TiC being present in an amount in excess of the stoichiometric amount required to react with the total amount of ZrB$_2$ according to the equation TiC + ZrB$_2 \rightarrow$ TiB$_2$ + ZrC; hot-pressing the mixture from 1 to 60 minutes at a temperature from 1900° C. to 2400° C. at a pressure of at least 2000 p.s.i. to form a hot-pressed compact having a room temperature density of 4.8 to 5.3 g./cc.; preferably the components will be hot-pressed for from 5 to 15 minutes at a temperature of from 1900° C. to 2100° C. and at a pressure of at least 4,000 p.s.i.; and then crushing the resulting hot-pressed compact to form abrasive particles.

Alternatively, the abrasive particles of this invention can be prepared as described above except that a mixture of TiC, ZrC and $TiB_2$ in the appropriate amounts to give the desired product are heated under pressure where they combine to form the hot-pressed compact.

The abrasive particles of this invention have a particle size of from $-20$ to $+400$ mesh (Standard U.S. Sieve) or 841μm to 37μm. When the abrasive particles are used in abrasive tools, such as grinding wheels, sizes from $-40$ to $+200$ mesh (420μm to 74μm) are preferred. For applications where the abrasive particles are used in a lapping composition, finer particles are used, for example, sizes from $-325$ (44μm) to $+400$ (37μm) are preferred. The $Knoop_{1000}$ hardness of these abrasive particles, as measured on the cold compact prior to crushing, ranges upward from 1,600 kg./mm$^2$ to 2,100 kg./mm$^2$.

DETAILED DESCRIPTION OF THE INVENTION

The abrasive particles of the invention contain a matrix of titanium carbide (TiC) and zirconium carbide (ZrC) with grains of crystalline titanium diboride ($TiB_2$) dispersed therethrough. The carbide matrix contains one or more solid solutions of TiC and ZrC and also some TiC or ZrC which may not have entered into solid solution. Formation of solid solutions in the matrix depends on processing conditions, such as particle size of the starting materials and pressing temperatures. Under the conditions herein taught at least 50% of the carbide in the matrix is in solid solution form. The carbides have a crystallite size of about 2 to 30μm. The boride component of the abrasive particles is present as grains of crystalline $TiB_2$ having a length in the range from about 0.5μm to about 30μm. The carbide and $TiB_2$ grains are readily observable on polished and etched surfaces of the abrasive particles of this invention by optical microscopy.

Transition metal carbides and borides tend to be deficient in carbon and boron in terms of their stoichiometric formulas. For example, in general practice titanium carbide actually occurs as $TiC_{1-x}$, where $x$ 32 0 to 0.5. The same applies to other transition metal carbides and borides used in this invention. Therefore, although the carbon or boron content of the particles of this invention is normally close to, but not necessarily equal to, stoichiometric, i.e., about $TiC_{0.9}$, it is conventional to describe these compositions by their stoichiometric formulas. It will be understood that such formulas are meant to include some lack of carbon and boron and do not cover only exact stoichiometric compositions.

It will be understood that parts and percentages as used in this specification are by weight unless otherwise specified. In addition, in describing the abrasive particles, the ranges discussed for the titanium and zirconium carbide and boride components are based on the total weight of the titanium and zirconium carbides and borides present. However, the ranges for other ingredients and all analytical results are based on the total weight of the abrasive particles.

The abrasive particles of this invention comprise a carbide-boride composite consisting of a carbide matrix and titanium diboride. The carbide matrix comprises from 69 to 94% of the weight of the abrasive particle. The carbide matrix is made up of one or more solid solutions of titanium and zirconium carbides. The zirconium carbide component of the carbide matrix is present in an amount of from 10 to 46% of the weight of the abrasive particles. The titanium boride component of the abrasive particles of this invention comprises from 6 to 31% of the weight of the abrasive particles. For optimum overall grinding characteristics, it is preferred that the mixed carbide matrix be present in an amount from 75 to 90% of the weight of the abrasive particles and the titanium diboride be present in an amount of from 10 to 25% of the total weight of the abrasive particles. It will also be preferred that the zirconium carbide component of the matrix is present in an amount of from 15 to 40% of the weight of the abrasive particles. These compositions are illustrated in FIG. 1, a triangular plot of titanium carbide, zirconium carbide and titanium diboride concentration. The solid lines (1) define the compositional boundaries of the invention, the dotted lines (2) define the compositional boundaries of the preferred embodiments of the invention.

In addition to the primary components of the abrasive particles, other materials can be present in amounts up to about 20%, based on the weight of the abrasive particles, so long as the structure of the abrasive particles, i.e., TiC/ZrC mixed carbide matrix having a crystallite size of about 2 to 30μm with grains of crystalline $TiB_2$ having a length mostly in the range from about 0.5μm to about 30μm dispersed therethrough, is maintained. Such materials, e.g., boron, $Al_2O_3$, TiN, ZrN, silicon, carbon, silicon carbide (SiC), boron carbide ($B_4C$), titanium dioxide ($TiO_2$), zirconium dioxide ($ZrO_2$), titanium and zirconium may be present in an amount which will not detract from the abrasive properties of the particles of this invention and may, in some instances, be added to modify the properties of the abrasive particles or to render the abrasive particles more suitable for wheel fabrication. These additives are most suitably added to the mixture of starting materials as powders having similar size characteristics to the transition metal carbide and boride powders, prior to milling.

The abrasive particles of this invention are prepared from zirconium diboride ($ZrB_2$) and TiC, said TiC being present in an amount in excess of the stoichiometric amount required to react with the total amount of $ZrB_2$ according to the equation $TiC + ZrB_2 \rightarrow TiB_2 + ZrC$. Alternatively, the abrasive particles of this invention can be prepared from a mixture of TiC, ZrC and $TiB_2$ in the appropriate amounts to give the desired product.

The transition metal borides and carbides useful as starting compounds in the preparation of the abrasive particles of the invention are commercially available in the form of powders containing particles of up to 100μm in diameter. After mixing the starting compounds, extended milling of the mixture on the order of days, is not necessary as the desired composite will form using particles as large as about 100μm, though a maximum diameter of 30μm is preferred. Milling can be performed in a conventional alumina ball mill and no liquid or inert gas cover is necessary.

Although this invention is not bound by any particular theory or explanation, it is believed that the grain size of the mixed carbide matrix and the grain size and distribution of $TiB_2$ throughout the mixed carbide matrix is primarily responsible for the superior performance of the abrasive particles of the invention. The grain size of the mixed carbide matrix and the grain size and distribution of $TiB_2$ in the mixed carbide matrix can be influenced at least to some extent by the particular process conditions, e.g., milling time, temperature, and duration of reaction.

Although extended milling is not essential to the production of good abrasive particles, sufficient milling i.e., from 1 to 12 hours, to insure starting compound particles having a maximum diameter of about 30μm is preferred. To produce especially sharp abrasive particles, it is recommended that the starting compounds be milled from 1 to 6 hours as it is believed that extended milling tends to give a final product with poorer fracture characteristics that do not regenerate sharp cutting edges.

When the starting compounds are heated under pressure, the mixture of starting compounds can be pressed in a conventional molding assembly consisting of a graphite sleeve in a graphite die surrounded by loose graphite powder and encased in a silica sleeve. The molding assembly is blanketed with nitrogen or inert gas such as helium or argon. Alternately the starting compounds can be heated under pressure in a vacuum. In practice the mixture of starting compounds is placed in the graphite sleeve between two graphite discs and subjected to high pressure, e.g., 4,000 p.s.i., at elevated temperatures, e.g., 2000° C. The duration of the compaction at top temperature, herein referred to as hold time, is from about 1 to 60 minutes, and preferably from about 5 to 15 minutes. The compact resulting from this hot-pressing operation has a room temperature density of 4.8 to 5.3 g./cc.

The temperature during pressing of the two-component starting mixture ($ZrB_2$ and excess TiC) or three-component starting mixture (TiC, ZrC and $TiB_2$) can be from 1900° C. to 2400° C., and preferably from 1900° C. to 2100° C. Under the same conditions of temperature, pressure and hold time, the abrasive particles resulting from the two-component starting mixture have a relatively homogeneous distribution of grains of crystalline $TiB_2$ mostly in the range from 0.5–10μm in length throughout the mixed carbide matrix, whereas the abrasive particles from the three-component starting mixture have less homogeneity of the $TiB_2$ grains and larger grain size, e.g., mostly in the range from 10μm to 30μm in length.

To achieve the best combination of performance properties, such as sharpness, fracture characteristics and grinding ratio, it is recommended that the two- or three-component starting mixture be milled from 1 to 6 hours and hot-pressed for 15 minutes at 2000° C. and 4,000° p.s.i.

The compact which results from subjecting the starting mixture to high temperature and pressure can be crushed to the desired particle size by any of a variety of conventional methods, e.g., jaw crushing, ball milling, rod milling and impact milling. Fines generated by the crushing operation, i.e., particles of smaller than desired size, can be recycled by substitution for all or part of the raw materials used to make the hot-pressed compacts.

The abrasive particles of the invention are particularly useful as components of abrasive wheels and other abrasive devices such as abrasive belts, papers (e.g., sandpaper), and honing sticks. The general procedures for fabricating abrasive wheels are well known in the art.

Abrasive wheels comprising abrasive particles, bonding agents, and optionally fillers and/or grinding aides, can be prepared by conventional methods in form suitable for a variety of applications. It will be understood that the abrasive particles of this invention can be included in wheels which employ inorganic bonding agents such as vitreous and ceramic materials, cements such as magnesium oxychloride, metals such as copper and various alloys or which employ organic bonding agents such as phenolic resins, polyimide resins, etc. It will also be understood that fillers and grinding aids such as calcium carbonate, cryolite, talcum, sulfur, dolomite and silicon carbide may be included in the grinding wheel composition if desired. The choice of bonding agent and other components depends to a large extent on the use to which the abrasive wheel is to be put and can be determined by one skilled in the art. The mix is molded to the desired shape, such as an abrasive wheel, and is cured, usually by heating during or after molding.

Specifically it has been found that the abrasive particles of this invention can be formed into vitreous bonded wheels by using any one of several commercially available glass frits. Frits which work particularly well have been found to have compositions in the vicinity of 55% $SiO_2$, 20% $B_2O_3$, 10% ZnO, 8% $Na_2O$ and 4% CaO. A secondary binder, such as paraffin or sodium silicate solution, can be used to give green strength between molding and firing. The firing cycle includes a low temperature heating in air or inert gas to remove any organic binder followed by high temperature heating at 850° to 1000° C in dry nitrogen. Contact with an oxidizing or wet atmosphere should be restricted to temperatures under 450° C.

There are three general areas of use in industry for abrasive wheels: (1) cutting hard materials, wherein wheels are usually resin bonded, (2) internal grinding, e.g., finishing the inside of a bearing race or a tube section, wherein wheels are usually vitreous bonded, and (3) surface grinding, e.g., machining a flat surface, wherein wheels are either vitreous, metal or resin bonded. The abrasive particles of this invention are suitable for use in all three areas.

Wheels containing the abrasive particles of this invention are useful for abrading a variety of materials such as metals, metal alloys, glass and quartz and are especially useful for grinding ferrous metal materials such as hard steels, e.g., AISI E52100.

It is well-known in the art that in commercial practice the performance of an abrasive wheel depends not only on the characteristics of the abrasive particles, but also on the strength of the bond between the particles and on the wheel structure, i.e., porosity, particle/bond-material weight ratio, etc. However, for a given bond type and wheel structure, the characteristics of the abrasive particles are primarily responsible for the performance of the abrasive wheel.

The performance of grinding wheels containing the abrasive particles of this invention may be improved by cladding the abrasive particles prior to wheel fabrication with metals or metal alloys. Such metals include nickel, copper and various alloys. The metal coatings can make up to 60% by weight of the weight of the coated abrasive particle.

The major criteria for evaluating the performance of an abrasive particle in an abrasive wheel are (1) grinding ratio, i.e., the ratio of the volume of metal removed to the volume of the wheel consumed, (2) workpiece profile retention, i.e., ability of the wheel to maintain an even wear surface as measured by the maximum variation of a peak-to-valley axial trace of the workpiece surface during the grinding operation, (3) surface finish, i.e., ability of the wheel to produce a smooth surface on the wokpiece as determined from the microscopic peak-to-valley variations on the surface of the workpiece, and (4) sharpness of the abrasive particles in the abrasive wheel, designated as lambda ($\Lambda$), i.e., the metal removal parameter, and measured as the volume of the metal removed per minute and inch of wheel width divided by the force required on the wheel.

Procedures which can be employed to determine these properties are discussed in detail in "Principles of Grinding" by R. S. Hahn and R. P. Lindsay, a five-part series which appeared in Machinery Magazine, July to November 1971. A brief description of the tests employed to develop data reported herein is presented in the following paragraphs.

Grinding ratio is the ratio of the volume of metal removed to the volume of wheel consumed. Before and after each test the dimensions of the wheel and the workpiece are measured with a micrometer to about 0.0001 inch. The volume of material lost by the workpiece and the wheel is then calculated and the former divided by the latter. For cutting wheels it is practical to calculate the groove volume in the workpiece by weighing the workpiece before and after the test.

Workpiece profile retention is the ability of the wheel to hold an even wear surface and produce the same workpiece profile after many runs without truing. With usage the center of a wheel may wear differently from the sides, or one side may be different from the other. This would produce non-uniform workpieces. The workpiece surface is measured with a Bendix Proficorder. The maximum peak-to-valley distance of such a trace is called the "profile".

Surface finish is the quality of the workpiece surface after grinding. The microscopic peak-to-valley variations of a Bendix Proficorder trace are called "surface finish".

Sharpness of the abrasive particles is related to the metal removal parameter, lambda ($\Lambda$), the metal removed per unit of time, wheel width and force applied on the wheel, expressed as in.$^3$/min.-lb.-in. $\Lambda$ is calculated by measuring the cubic inches of metal removed per minute per inch of wheel width as a function of force applied on the wheel per inch of width. The slope of the plot of the metal removal rate versus applied force is $\Lambda$.

Typical resin bonded abrasive wheels containing from 25% to 50% by volume of the abrasive particles of the invention generally exhibit the following performance properties on steel: grinding ratio from 1 to 2,600; workpiece profile retention from 50 to 150 microinches (1.27 to 3.81 $\mu$m), and preferably less than 70 microinches (1.79 $\mu$m); surface finish from 5 to 20 microinches (0.13 to 0.51 $\mu$m), and preferably less than 10 microinches (0.25 $\mu$m); and $\Lambda$ from 0.0004 to 0.0020 in.$^3$/min.-lb.-in. (0.00571 to 0.0285 cm.$^3$/min.-kg.-cm.).

High performance abrasive wheels exhibit an optimum balance of the above-described properties. Generally, the higher the grinding ratio the better so long as other properties such as workpiece profile retention, surface finish, and $\Lambda$ are not sacrificed. A workpiece profile retention of less than about 70 microinches (1.79 $\mu$m), a surface finish of less than 20 microinches (0.51 $\mu$m), and sharpness, i.e., $\Lambda$, of at least 0.0010 in.$^3$/min.-lb.-in. (0.0146 cm.$^3$/min.-kg.-cm.) are generally characteristic of a high performance abrasive wheel.

DESCRIPTION OF THE ANALYSES

Titanium and zirconium are determined by X-ray fluorescence. About 0.154 gram of sample is oxidized in air at 1000° C. overnight and then fused in borax in a platinum crucible until the sample dissolves. The melt is then poured onto a preheated aluminum plate at 350° C. to form a pellet, which is ground to an optically flat surface on one side using a 45-micron diamond polishing disc. The pellet is analyzed in a G. E. XRD-6 Spectrograph. The platinum target X-ray tube is operated at 50 kV/60mA for Ti and at 35 kV/5mA for Zr using first order $Ti_{k\alpha}$ and $Zr_{k\alpha}$ spectral lines. The radiation is dispersed by a LiF analyzing crystal and is detected with a scintillation counter. Pulse height analysis is applied and data collected for a 100 second period. The X-ray intensities are compared to calibration curves prepared from pure $TiO_2$ and $ZrO_2$ standards fused in borax under identical conditions.

Carbon is determined by "Leco" carbon analyzer, where the samples are burned in oxygen and $CO_2$ is determined in an absorption train. Boron is determined by fusion of the sample with carbonate, dissolution in HCl and titration with NaOH in the presence of mannitol.

Minor impurities are determined by spectrographic analysis in a D.C. arc using a Jarrell-Ash, Model 7a-7100 3.4 meter, plane grating spectrograph.

Density of the abrasive particles is determined by liquid or air displacement. In one method about 5 to 10 grams of the abrasive particles ($-60/+170$ mesh or $-250/+88$ $\mu$m) are placed in a 25-ml. specific gravity bottle and the volume of the sample is calculated from alcohol displacement. In another method, larger samples, up to 100 grams, are measured by a Beckman, Model 930, air comparison pycnometer.

The density determined by these methods is expressed as "apparent density" and differs from the true density of the phases present by the porosity of the compact. The abrasive particles of this invention have a porosity of less than about 5%.

Microhardness on the Knoop scale is determined with a Tukon Tester, Model MO, made by the Wilson Mechanical Instrument Division, American Chain and Cable Co., Inc. Coarse fragments of the compacts are embedded in Bakelite and polished with consecutively finer diamond abrasive, finishing with 1 $\mu$m size. For each determination, ten measurements are made on the polished surface with an applied load of 500 or 1000 grams, as indicated, held for 15 seconds.

Phase analysis is done by X-ray diffraction using a Debye-Scherrer powder camera with $Cu_{k\alpha}$ radiation from a Norelco type 12045B unit at 40kV/20mA, and 5 to 10 hour exposure. Compositions of the solid solutions are calculated from the lattice constants by reference to curves of lattice parameter versus composition for the systems; TiC-ZrC and $TiB_2$-$ZrB_2$ published in "A Handbook of Lattice Spacings and Structures of Metals and Alloys" by W. B. Pearson (1964).

Titanium diboride crystal size is determined by optical microscopy. Polished surfaces are produced by the same method used for microhardness determination. Good contrast between the $TiB_2$ phase and the mixed carbide matrix is obtained by electrolytic etching for about one second at 2 volts in an acid solution of 30%HF, 5%$HNO_3$, 1%$H_2O_2$ at room temperature. Several dark field photomicrographs are taken with a Leitz Panphot microscope at a magnification of 500x on Polaroid type 47 film. These photos are then enlarged to 8 × 10 inches and approximately 50 $TiB_2$ grains measured.

Carbide crystallite or grain size is determined by the same procedure used for titanium diboride crystal size except that after the HF etch the sample is washed with distilled water and then etched in a solution of 15 gms of $K_3Fe(CN)_6$ and 15 gms. of KOH in 100 ml of distilled water at 50° C. This etch reveals the carbide grain boundaries.

EXAMPLE 1

One hundred twenty grams of commercial titanium carbide and eighty grams of commercial zirconium diboride powders having particle diameters up to 100μm are thoroughly mixed and milled with 100 ml. of tetrachloroethylene in a conventional procelain ball mill having a 4.875 inch inside diameter (12.4 cm.) and 5.85 inch outside diameter (14.9 cm.) with 3/8 inch diameter (0.95 cm.) alumina balls for 32 hours at 60 rpm. The ground powder mixture is air dried to remove the tetrachloroethylene. Forty grams of the powder mixture is placed in a one inch inside diameter (2.54 cm.) cylindrical graphite mold surrounded with graphite powder and is pressed at 2000° C. and 4,000 p.s.i. (281.2 kg./cm.$^2$) for 5 to 15 minutes under nitrogen. Heat-up time to 2000° C. is 25 to 30 minutes. A pressure of 2,000 p.s.i. (140.6 kg./cm.$^2$) is applied at the start of heating and is then increased to 4,000 p.s.i. (281.2 kg./cm.$^2$) when the mold reaches a temperature of about 1900° C. and is held at this point during the rest of the heat-up and through the temperature hold period. The mold is then allowed to cool and the cold compact is removed.

To render the composition thus formed useful as a component of an abrasive tool, the cold compact is size-reduced in a conventional jaw-crusher, followed by size reduction by hand in a steel mortar. The crushed product is then screened into four fractions of abrasive particles having the following U.S. Standard Sieve sizes: +20, −20/+40, −40/+80 and −80 (+840μ, −840/+420μ, −420/+177μ, −177μ).

This procedure is repeated twice and the resulting abrasive particles are composited.

Elemental analysis of the particles is: Ti, 42.5%; Zr, 26.3%, C, 6.8%; and B, 7.2% by weight. This corresponds to 38.7% TiC, 34.6% ZrC and 26.7% TiB$_2$. X-ray diffraction shows that TiB$_2$ and two solid solution phases of TiC and ZrC are present. Fe is present at about the 0.5% level, partly as a surface impurity on the particles from the crushing operation. The total of other heavy metal constituents (including Cr, Co, Mn, Ni, Mo, Cu, Pb, Ag) is less than one percent by weight. Of the lighter metal elements, Al, Si, Ca, Mg are present in a total concentration of about 2.2%. These elements enter the sample primarily during milling of the starting powders. Oxygen and nitrogen in the sample is below the detection limit of X-ray diffraction analysis for oxide or nitride phases.

Density is found to be 5.07 g./cc. by air pycnometer. Knoop$_{500}$ microhardness is 1985.

Ten grams of the −40+80 (−420/+177μ) mesh abrasive particles are blended with 3.5 grams of epoxy resin (Devcon F) as a binder and one gram of NaCl for porosity and is formed into a small internal grinding wheel in an aluminum mold. The wheel is hardened at room temperature. The dimensions of the wheel are: outside diameter three-fourths inch (1.9 cm.), width three-fourths inch (1.9 cm.) and arbor three-eighths inch (0.95 cm.).

The wheel is tested by grinding the inside of one inch (2.54 cm.) AISI No. C1020 steel pipe on a Jones & Shipman grinding machine. Grinding conditions are 16,500 rpm spindle speed, 82 rpm chuck rotation, five minutes grinding time and cooling with water containing Norton 203 grinding fluid.

At the conclusion the wheel diameter is found to have been reduced by 0.5 mils (0.013 mm), and the pipe I.D. is increased by 1.6 mils (0.041 mm) along a one-inch (2.54 cm.) section. This corresponds to a grinding ratio of 5.7 calculated from the formula:

$$G = \frac{\text{Pipe diameter I.D.}}{\text{Wheel diameter O.D.}} \times \frac{\text{increase in pipe diameter}}{\text{decrease in wheel diameter}} \times \frac{\text{length of grind}}{\text{width of wheel}}$$

CONTROL A

A control wheel similar to that used in Example 1 is fabricated using a commercially available abrasive grade of aluminum oxide (−40/+80 mesh or −420/+177μ) instead of the abrasive particle composition of Example 1. Testing is done under identical conditions for an equal length of time. After the test, the wheel diameter is found to have been reduced by 0.5 mils (0.013 mm) and the pipe I.D. is increased by only 0.2 mils (0.0051 mm) along a one-inch section (2.54 cm.). This corresponds to a grinding ratio of 0.7 and demonstrates that the abrasive particles of this invention have a substantially higher grinding ratio when used to grind steel than aluminum oxide.

EXAMPLE 2

Four batches of abrasive particles are prepared as follows: One hundred twenty grams of commercial titanium carbide and eighty grams of commercial zirconium diboride powders having particle diameters up to 100μm are thoroughly mixed and dry milled in a conventional porcelain ball mill similar to that used in Example 1 for four to twelve hours at 60 rpm. One hundred grams of the powder mixture is placed in a two-inch diameter (5.08 cm.) cylindrical graphite mold surrounded with graphite powder and is pressed at 2000° C. and 4,000 p.s.i. (281.2 kg./cm.$^2$) for 5 to 15 minutes under nitrogen. Heat-up time to 2000° C. is three hours. A pressure of 2,000 p.s.i. (140.6 kg./cm.$^2$) is applied at the start of heating and is then increased to 4,000 p.s.i. (281.2 kg./cm.$^2$) when the mold reaches a temperature of about 1900° C. and is held at this point during the rest of the heat-up and through the temperature hold period. The mold is then allowed to cool, the cold compact is removed and the compact is crushed and screened as in Example 1. This procedure is repeated four times and the resulting abrasive particles composited.

The abrasive particles of this example are analyzed and found to contain 47.1% Ti, 31.2% Zr, 7.4% C and 7.0% B. This corresponds to 40.3% TiC, 36.3% ZrC and 23.4% TiB$_2$. Minor elements present were Si (1%), Al (0.8%), total of heavy metals about 1%.

The apparent density of the abrasive particles is 5.20 g./cc.

A cutting wheel 1/16 inch (.16 cm.) thick and 5 inches (12.7 cm.) in diameter is molded under pressure from a composition consisting essentially of 200 g. of the −40/+80 mesh (−420/+177 μm) abrasive particles, 36 g. of phenolic resin, 15 g. of cryolite powder and 9 g. of furfural. The cutting wheel weighs 63 g. and has a density of 3.38 g./cc.

The cutting wheel is mounted on a spindle turning at 3450 rpm, giving a surface speed on the edge of the wheel of 4517 ft./min. (1377 m/min.) and is tested on the surfaces listed in Table 1.

The grinding ratios are calculated by weighing the wheels and workpieces before and after each test. Two cooling liquids are used: plain water and oil/water mixture (one part WB Grinding Concentrate 1500 to ten parts of water).

CONTROL B

A control cutting wheel of the type and size described above is fabricated using a commercially available aluminum oxide abrasive of $-40/+80$ mesh size ($-420/+177\mu$) instead of the abrasive particle composition of Example 2. The composition from which the control cutting wheel is molded consists essentially of 748 g. of aluminum oxide, 179 g. phenolic resin, 73 g. cryolite and 45 g. of furfural. The finished control cutting wheel weighs 48 g., has a density of 2.59 g./cc. and contains the same percent by volume of abrasive particles as the cutting wheel containing the abrasive particles of Example 2.

The control cutting wheel is tested as in Example 2 and the grinding ratios are listed in Table 1.

CONTROL C

A control cutting wheel of the type and size described above is fabricated using a commercially available silicon carbide abrasive of $-40/+80$ mesh size ($-420/+177\mu$) instead of the abrasive particle composition of Example 2 so that the control cutting wheel contains the same percent by volume of abrasive particles as the cutting wheel containing the abrasive particles of Example 2. The composition from which the control cutting wheel is molded consists essentially of 706 g. silicon carbide, 209 g. phenolic resin, 85 g. cryolite and 53 g. furfural.

The control cutting wheel is tested as in Example 2 and the grinding ratios are listed in Table 1.

TABLE 1

| Surface Tested | Cutting Wheel Tested | Grinding Ratio | |
|---|---|---|---|
| | | Water Coolant | Oil/Water Coolant |
| Low carbon stainless steel | ( Example 2 | 7.9 | 11.2 |
| (American Iron and Steel | ( Control B | 3.9 | 6.8 |
| Institute No. 303) | ( Control C | 3.4 | 4.9 |
| Nickel Alloy (76% Ni, 15.5% | ( Example 2 | 4.6 | 14.1 |
| Cr, 8% Fe) | ( Control B | 1.6 | 6.5 |
| | ( Control C | 2.2 | 1.7 |
| Titanium Alloy (88.6% Ti, | ( Example 2 | 3.9 | 8.2 |
| 6.6% Al, 4.2% V, 0.16% $O_2$, | ( Control B | 2.9 | 3.2 |
| 0.13% Fe, 0.03% C, 0.008% N, 0.006% H) | ( Control C | 1.2 | 2.1 |
| Starrett steel No. 496 | ( Example 2 | 4.7 | — |
| (96.7% Fe, 1.2% Mn, 0.9% | ( Control B | 1.7 | — |
| C, 0.5% Cr, 0.5% W, 0.2% V) | ( Control C | 2.4 | — |

As is apparent from the data presented in Table 1, the cutting wheel fabricated with the abrasive particles of Example 2 is superior in cutting a variety of metals to cutting wheels formulated using conventional abrasive particles.

EXAMPLES 3 to 18

Two hundred gram blends of commercial titanium carbide, zirconium carbide, titanium diboride and zirconium diboride powders containing particles having diameters up to 100μm are thoroughly mixed in the proportions listed in Table 2. The powders are milled at 60 rpm for 6 hours in a porcelain ball mill similar to the ball mill used in Example 1 with 3/8 inch diameter (.95 cm.) alumina balls or in a rubber lined ball mill measuring 5.75 inches inside diameter (14.6 cm.) and 6.38 inches outside diameter (16.2 cm.) with one-fourth inch × one-fourth inch cylindrical (0.64 cm. × 0.64 cm.) 94% tungsten carbide, 6% cobalt media.

After milling, the maxium particle size in the powder is about 30μm. About 100 grams of the mixture is then placed in a cylindrical graphite mold having a diameter of two inches (5.1 cm.), and induction heated under nitrogen gas in the presence of loose graphite powder in the space around the mold. The heat-up period is usually about three hours. The mixture is held at top temperature as listed in Table 2 for 15 minutes and is pressed at 4,000 p.s.i. (281.2 kg./cm.$^2$). A pressure of 2,000 p.s.i. (140.6 kg./cm.$^2$) is applied at the start of heating and increased to 4,000 p.s.i. (281.2 kg./cm.$^2$) when the mold reaches a temperature of about 100° C. less than the ultimate temperature and is held at this pressure for the remaining heat-up period and through the temperature hold period. After the mold has cooled, the cold compact is removed from the mold. The compact is size-reduced in a conventional jaw-crusher and then by hand in a steel mortar. The crushed product is screened into size fractions having the following mesh sizes (U.S. Standard Sieve): $+60$, $-60/+80$, $-80/+100$, $-100/+140$, $-140/+170$, $-170 (+250\mu$, $-250/+177\mu$, $-177/+149\mu$, $-149/+150\mu$, $-105/+88\mu$, $-88\mu$).

The starting composition of the powder blends, the milling media and milling duration, hot-pressing temperature and hold time, apparent density, Knoop$_{1000}$ microhardness and product composition are listed in Table 2.

The elemental analyses of the abrasive particles are listed in Table 3.

Electron probe microanalysis of several samples with an Applied Research Laboratories type EMX model 21000-11 microprobe shows high concentration areas for Ti and C, Zr and C, Ti and B, but not for Zr and B. This indicates that ZrB$_2$ is absent in the product, at least to the degree of the resolution of the method. The conclusion is also supported by X-ray powder diffraction patterns, where ZrB$_2$ lines are absent. As shown by the phase analyses in Table 3, the product comprises TiB$_2$ plus carbides of Ti and Zr at least partially in one or more solid solutions.

Polished and etched coarse fragments of the compacts are checked for TiB$_2$ grain size and carbide grain size. The TiB$_2$ is found to be present as grains 0.5 to 30 μm long while the carbide grain size is 2–30μm.

TABLE 2

| No. | Starting Components (wt. percent) | | | | Milling Media | Time (hrs) | Hot Pressing Temp. °C | Time (min) | Apparent Density g/cc | Micro-hardness Knoop$_{1000}$ kg/mm | Product Composition * Wt.% on Ti,Zr,carbide/boride basis | | | |
|---|---|---|---|---|---|---|---|---|---|---|---|---|---|---|
| | TiC | ZrB$_2$ | ZrC | TiB$_2$ | | | | | | | TiC | ZrC | TiB$_2$ | ZrB$_2$ |
| Control D | 90 | 10 | — | — | Al$_2$O$_3$ | 6 | 2000 | 15 | 5.01 | 1720 | 84.1 | 9.6 | 6.3 | — |
| Control E | " | " | — | — | " | " | " | " | 5.01 | 1720 | 84.1 | 9.6 | 6.3 | — |
| 3 | 80 | 20 | — | — | " | " | " | " | 5.01 | 1760 | 69.8 | 18.4 | 11.8 | — |
| 4 | " | " | — | — | " | " | " | " | 5.01 | 1760 | 69.8 | 18.4 | 11.8 | — |
| 5 | " | " | — | — | " | " | " | " | 5.01 | 1760 | 69.8 | 18.4 | 11.8 | — |
| 6 | 70 | — | 18 | 12 | " | " | " | " | 5.12 | 1880 | 68.3 | 18.7 | 13.0 | — |
| 7 | " | — | " | " | " | " | " | " | 5.12 | 1880 | 68.3 | 18.7 | 13.0 | — |
| 8 | 60 | 40 | — | — | " | " | 1900 | " | 5.06 | 1880 | 37.2 | 36.4 | 26.4 | — |
| 9 | " | " | — | — | " | " | " | " | 5.06 | 1880 | 37.2 | 36.4 | 26.4 | — |
| 10 | " | " | — | — | " | " | 2000 | " | 5.26 | 1924 | 37.0 | 37.1 | 25.9 | — |
| 11 | " | " | — | — | " | " | " | " | 5.26 | 1924 | 37.0 | 37.1 | 25.9 | — |
| 12 | 40 | — | 35 | 25 | " | " | " | " | 5.13 | 1990 | 42.0 | 35.2 | 22.8 | — |
| 13 | " | — | " | " | " | " | " | " | 5.13 | 1990 | 42.0 | 35.2 | 22.8 | — |
| 14 | " | — | " | " | " | " | " | " | 5.13 | 1990 | 42.0 | 35.2 | 22.8 | — |
| 15 | 70 | 20 | — | 10 | " | " | " | " | 5.00 | 1920 | 59.3 | 18.5 | 22.2 | — |
| 16 | 70 | 20 | 10 | — | " | " | " | " | 4.90 | 1880 | 59.6 | 28.0 | 12.4 | — |
| Control F | 50 | 50 | — | — | " | " | 1900 | " | 5.27 | 1880 | 24.5 | 45.2 | 30.3 | — |
| 17 | 40 | — | 40 | 20 | WR | " | " | " | 5.28 | 1880 | 41.3 | 39.9 | 18.8 | — |
| 18 | 40 | — | 30 | 30 | " | " | " | " | 5.12 | 2000 | 41.5 | 29.7 | 28.8 | — |
| Control G | 20 | 80 | — | — | Al$_2$O$_3$ | " | " | " | 5.62 | 2020 | 4.5 | 26.9 | 23.4 | 45.2 |
| Control H | 99 | — | — | ** | WR | " | 2000 | " | 4.92 | 1920 | 96.4 | — | 3.6 | — |
| Control I | 99 | — | — | ** | " | " | " | " | 4.92 | 1920 | 96.4 | — | 3.6 | — |
| Control J | 70 | — | — | 30 | " | " | " | " | 4.87 | 1760 | 71.8 | — | 28.2 | — |

* Calculated from analyses
** Added elementary boron, 1% by weight

TABLE 3

| No. | Elemental Analysis (Weight percent) | | | | | | | | | | Phase Analysis by X-ray Diffraction | | | | |
|---|---|---|---|---|---|---|---|---|---|---|---|---|---|---|---|
| | Ti | Zr | C | B | Al | Fe | Si | Cr | Co | Ni | Phases | Lattice Constants (A°) a | c | Phase Composition | Wt. % |
| Control D | 67.7 | 8.0 | 16.1 | 1.8 | 1.0 | 0.1 | 0.1 | 0.05 | 0.10 | 0.05 | Cubic | 4.32 | | TiC | 94 |
| Control E | " | " | " | " | " | " | " | " | " | " | Hexagonal | 3.01 | 3.20 | TiB$_2$ | 6 |
| 3 | 63.1 | 16.6 | 15.1 | 3.5 | >1.0 | 0.02 | 0.2 | 0.1 | 0.05 | 0.02 | Cubic | 4.34 | | (Ti$_{.97}$Zr$_{.03}$)C | 70 |
| 4 | " | " | " | " | " | " | " | " | " | " | Cubic | 4.62 | | (Ti$_{.24}$Zr$_{.76}$)C | 18 |
| 5 | " | " | " | " | " | >1. | 0.8 | 0.3 | 0.05 | 0.01 | Hexagonal | 3.01 | 3.22 | TiB$_2$ | 12 |
| 6 | 60.2 | 15.6 | 14.5 | 3.8 | " | 0.2 | 0.2 | 0.5 | 0.1 | 0.02 | Cubic | 4.36 | | (Ti$_{.93}$Zr$_{.07}$)C | 77 |
| 7 | " | " | " | " | " | " | 0.1 | 0.3 | " | " | Cubic | 4.62 | | (Ti$_{.24}$Zr$_{.76}$)C | 11 |
| | | | | | | | | | | | Hexagonal | 3.01 | 3.24 | TiB$_2$ | 12 |
| 8 | 45.4 | 30.5 | 11.5 | 7.8 | 1.0 | 1.0 | 0.1 | 0.2 | 0.1 | 0.10 | Cubic | 4.61 | | (Ti$_{.26}$Zr$_{.74}$)C | 44 |
| 9 | " | " | " | " | " | 0.1 | " | 0.1 | " | " | Cubic | 4.33 | | TiC | 31 |
| | | | | | | | | | | | Hexagonal | 3.02 | 3.22 | TiB$_2$ | 25 |
| 10 | 45.1 | 28.0 | 11.5 | 7.8 | 0.3 | 1. | 0.3 | 0.1 | 0.1 | 0.01 | Cubic | 4.61 | | (Ti$_{.26}$Zr$_{.74}$)C | 44 |
| 11 | " | " | " | " | 0.3 | >1. | 0.3 | 0.1 | 0.1 | 0.01 | Cubic | 4.33 | | TiC | 31 |
| | | | | | | | | | | | Hexagonal | 3.02 | 3.20 | TiB$_2$ | 25 |
| 12 | 47.7 | 30.1 | 11.6 | 6.8 | >1. | 0.5 | 0.2 | 0.8 | 0.2 | 0.02 | Cubic | 4.60 | | (Ti$_{.29}$Zr$_{.71}$)C | 45 |
| 13 | " | " | " | " | " | " | " | " | " | " | Cubic | 4.32 | | TiC | 30 |
| 14 | " | " | " | " | " | " | " | 1. | " | " | Hexagonal | 3.01 | 3.21 | TiB$_2$ | 25 |
| 15 | 59.2 | 15.4 | 12.8 | 6.5 | " | 0.3 | 0.1 | 0.1 | " | 0.01 | Cubic | 4.34 | | (Ti$_{.97}$Zr$_{.03}$)C | 59 |
| | | | | | | | | | | | Cubic | 4.61 | | (Ti$_{.26}$Zr$_{.74}$)C | 19 |
| | | | | | | | | | | | Hexagonal | 3.01 | 3.22 | TiB$_2$ | 22 |
| 16 | 53.4 | 23.7 | 13.6 | 3.7 | " | 0.1 | 0.6 | 0.06 | 0.05 | 0.01 | Cubic | 4.61 | | (Ti$_{.26}$Zr$_{.74}$)C | 34 |
| | | | | | | | | | | | Cubic | 4.33 | | TiC | 54 |
| | | | | | | | | | | | Hexagonal | 3.01 | 3.23 | TiB$_2$ | 12 |
| Control F | 39.0 | 38.4 | 9.5 | 9.1 | 1.0 | 1.0 | 0.08 | 0.1 | 0.1 | 0.10 | Cubic | 4.58 | | (Ti$_{.33}$Zr$_{.67}$)C | 60 |
| | | | | | | | | | | | Cubic | 4.32 | | TiC | 9 |
| | | | | | | | | | | | Hexagonal | 3.00 | 3.21 | TiB$_2$ | 31 |
| 17 | 43.8 | 33.5 | 11.6 | 5.5 | 0.3 | 0.5 | 0.03 | 0.5 | 0.2 | 0.03 | Cubic | 4.59 | | (Ti$_{.33}$Zr$_{.67}$)C | 51 |
| | | | | | | | | | | | Cubic | 4.32 | | TiC | 29 |
| | | | | | | | | | | | Hexagonal | 3.01 | 3.21 | TiB$_2$ | 20 |
| 18 | 49.4 | 24.4 | 10.6 | 8.3 | 0.3 | 0.3 | 0.03 | 0.5 | 0.2 | 0.03 | Cubic | 4.58 | | (Ti$_{.35}$Zr$_{.65}$)C | 39 |
| | | | | | | | | | | | Cubic | 4.32 | | TiC | 31 |
| | | | | | | | | | | | Hexagonal | 3.01 | 3.20 | TiB$_2$ | 30 |
| Control G | 18.5 | 56.0 | 4.5 | 14.2 | 0.5 | 0.05 | 0.5 | 0.1 | 0.5 | 0.10 | Cubic | 4.64 | | (Ti$_{.17}$Zr$_{.83}$)C | 32 |
| | | | | | | | | | | | Hexagonal | 3.11 | 3.43 | (Ti$_{.33}$Zr$_{.67}$)B$_2$ | 61 |
| | | | | | | | | | | | Hexagonal | 3.05 | 3.29 | (Ti$_{.80}$Zr$_{.20}$)B$_2$ | 7 |
| Control H | 77.4 | — | 17.8 | 1.1 | 0.05 | 0.03 | 0.02 | 0.01 | 0.05 | 0.01 | Cubic | 4.32 | — | TiC | 96 |
| Control I | — | — | " | " | " | " | " | " | " | " | Hexagonal | 3.00 | 3.24 | TiB$_2$ | 4 |
| Control J | 76.1 | — | 13.1 | 7.3 | 0.05 | 0.03 | 0.02 | 0.5 | 0.3 | 0.05 | Cubic | 4.29 | | TiC | 70 |
| | | | | | | | | | | | Hexagonal | 3.00 | 3.21 | TiB$_2$ | 30 |

Rimmed test wheels are prepared using standard procedures known in the art. The abrasive particles are mixed with a phenolic resin containing inorganic fillers, such as dolomite, CaCO$_3$, and finely divided SiC, and are then hot-pressed around a cylindrical aluminum core. The abrasive grain comprises 25% of the wheel volume exclusive of the core while the remaining 75% is resin and filler. The rimmed wheels are five-eighth inch (1.59 cm.) wide with a rim thickness of 1/16 inch (0.16 cm.). The wheel diameter varies from 1/¼ inch to 1/¾ inch (3.18 to 4.45 cm.). The abrasive particle sizes and wheel diameters are given in Table 4.

The wheels are tested on AISI E52100 steel using a model ICF70 controlled force internal grinder manufactured by the Cincinnati-Milacron Corporation, Heald Division. The machine is operated at a wheel speed of 6400 ft./min. (1951 m./min.), workspeed of 200 ft./min. (61 m/min.), constant down feed of 0.1 in.³/min. (0.016 cm.³/min.) per inch (2.54 cm.) of wheel width and axial reciprocation magnitude of 0.060 inch (0.152 cm.). The wheels are dressed with a cup type rotary diamond dresser running at 4200 rpm or 1100 ft./min. (335 m/min.) with a lead of 0.004 inch/revolution (0.010 cm./revolution) and a depth of dress of 0.0002 inch (0.0005 cm.) on diameter. The wheels and work are measured at the completion of 5, 30, 55 and 80 grinds after dressing. Each grind consists of a rough grind of about 10 seconds at the above feed rate followed by a "sparkout" time wherein the wheel ground out stock using, and reducing, the deflection of the system placed there during the rough grind. In grind runs 25 to 28, 50 to 53 and 75 to 78 the grinding pressure is lowered in about 10 p.s.i. increments (0.70 kg./cm.²) to determine the metal removal rate as a function of force applied on the wheel for the calculation of $\Lambda$, the metal removal parameter. An initial value of $\Lambda$ is similarly determined before run 1 with dressing preceding and following this operation. For each sample the four values of grinding ratio, $\Lambda$, profile and finish are averaged.

Results of the grinding tests are given in Table 4.

Examples 3 to 18 show that the abrasive particles of this invention are effective in grinding steel when they consist essentially of 69% to 94% by weight of a carbide matrix of titanium and zirconium carbide wherein the zirconium carbide is present in the amount of from 10 to 46% by weight, and from 6 to 31% by weight of crystalline titanium diboride grains dispersed throughout said carbide matrix. These examples also show that the abrasive particles of the invention are most effective in grinding steel when the carbide matrix constitutes from 75 to 90% and the titanium diboride 25 to 10% of the particles while the zirconium carbide content is from 15 to 40%.

TABLE 4

GRINDING RESULTS
Average Values

| No. | Grain Size U.S. Std. Mesh | Wheel Diameter (inches) | Profile (microinches) | Finish (microinches) | $\Lambda_w 10^5$ (cu.in/min.lb.in.) | Grinding Ratio |
|---|---|---|---|---|---|---|
| Control D | 60/80 | 1¼ | 86 | 16 | 35 | 489 |
| Control E | 80/100 | " | 89 | 16 | 55 | 863 |
| 3 | 60/80 | " | 52 | 13 | 37 | 1206 |
| 4 | 80/100 | " | 83 | 13 | 63 | 1940 |
| 5 | 140/170 | 1½ | 56 | 5 | 133 | 1380 |
| 6 | 80/100 | " | 90 | 6 | 127 | 980 |
| 7 | 140/170 | 1¾ | 40 | 6 | 112 | 2573 |
| 8 | 80/100 | 1¼ | 53 | 9 | 60 | 1588 |
| 9 | 140/170 | 1¼ | 81 | 5 | 87 | 1597 |
| 10 | 80/100 | 1¼ | 64 | 11 | 79 | 1351 |
| 11 | 140/170 | 1½ | 126 | 6 | 133 | 1061 |
| 12 | 80/100 | " | 68 | 11 | 61 | 1070 |
| 13 | 80/100 | " | 64 | 8 | 64 | 1264 |
| 14 | 140/170 | " | 65 | 5 | 140 | 1520 |
| 15 | 80/100 | 1¾ | 130 | 12 | 47 | 1064 |
| 16 | 80/100 | 1¼ | 99 | 8 | 67 | 1283 |
| Control F | 80/100 | 1¾ | 115 | 10 | 46 | 500 |
| 17 | 80/100 | 1¼ | 98 | 11 | 54 | 1021 |
| 18 | 80/100 | 1¼" | 101 | 7 | 56 | 967 |
| Control G | 80/100 | 1¼ | 80 | 12 | 50 | 0 |
| Control H | 80/100 | " | 86 | 18 | 63 | 707 |
| Control I | 140/170 | 1½ | 98 | 5 | 133 | 1290 |
| Control J | 80/100 | " | 197 | 20 | 47 | 610 |

EXAMPLES 19 to 46

Examples 19 to 46 are carried out to determine the effect on the grinding properties of further variation of process conditions such as milling time, hot-pressing, hold time and temperature, and minor additions of other elements to the abrasive particles. The preparations and tests are carried out by the same general procedure as for Examples 3 to 18. The compositions, process conditions and grinding results are given in Tables 5 and 6.

Examples 19 to 46 and Table 5 illustrate the preparation of a number of compositions within the scope of this invention under a variety of conditions so that such compositions may be compared with available abrasive particles.

CONTROLS K to N

For comparison with the compositions of Examples 19 to 46 four wheels containing abrasive particles other than those of this invention are tested by the procedures used in Examples 3 to 18. The wheels tested are as follows:

Control K — commercial vitreous bonded alumina abrasive wheel,

Controls L & M — 2A alumina abrasive particles fabricated into resin bonded wheels by the procedure of Examples 3 to 46, Control N — commercial cubic boron nitride wheel.

The grinding results in Table 6 show that the abrasive particles of this invention have a better grinding action on steel than aluminum oxide, and that they approach the grinding action of cubic boron nitride.

TABLE 5

| | Starting Components (weight percent) | | | | | Milling | | Hot Pressing | | Apparent Density (g/cc) | Micro-hardness kg/mm² Knoop$_{1000}$ | Product Composition* | | | |
|---|---|---|---|---|---|---|---|---|---|---|---|---|---|---|---|
| | | | | | | | | | | | | Wt.% on Ti,Zr, carbide/ boride basis | | | Wt.% Total Basis |
| No. | TiC | ZrB$_2$ | ZrC | TiB$_2$ | Other | Media | Time (hrs) | Temp. °C | Time (min) | | | TiC | ZrC | TiB$_2$ | Other |
| 19 | 80 | 20 | — | — | — | Al$_2$O$_3$ | 6 | 1900 | 15 | 4.89 | 1760 | 70 | 18 | 12 | — |
| 20 | " | " | — | — | — | WR | " | 2000 | " | 5.00 | 1760 | " | " | " | — |

TABLE 5-continued

| | Starting Components (weight percent) | | | | | Milling | | Hot Pressing | | Apparent Density | Micro-hardness kg/mm² | Product Composition* Wt.% on Ti,Zr, carbide/ boride basis | | | Wt.% Total Basis |
|---|---|---|---|---|---|---|---|---|---|---|---|---|---|---|---|
| No. | TiC | ZrB₂ | ZrC | TiB₂ | Other | Media | Time (hrs) | Temp. °C | Time (min) | (g/cc) | Knoop₁₀₀₀ | TiC | ZrC | TiB₂ | Other |
| 21 | " | " | — | — | — | Al₂O₃ | " | 2100 | " | 4.88 | 1880 | " | " | " | — |
| 22 | " | " | — | — | — | " | 5 | " | " | 4.88 | 1880 | " | " | " | — |
| 23 | 70 | — | 18 | 12 | — | " | 3 | 2000 | " | 5.08 | 1760 | " | " | " | — |
| 24 | 54 | — | 27 | 19 | — | " | 6 | " | " | 5.12 | 1920 | 54 | 27 | 19 | — |
| 25 | " | — | " | " | — | " | 6 | " | " | 5.12 | 1920 | " | " | " | — |
| 26 | 60 | 40 | — | — | — | — | 0 | " | " | 5.26 | 2080 | 39 | 36 | 25 | — |
| 27 | " | " | — | — | — | — | 0 | " | " | 5.26 | 2080 | " | " | " | — |
| 28 | " | " | — | — | — | Al₂O₃ | 1 | " | " | 5.39 | 1880 | " | " | " | — |
| 29 | " | " | — | — | — | " | 3 | " | " | 5.27 | 1880 | " | " | " | — |
| 30 | " | " | — | — | — | WR | 24 | " | " | 5.29 | 1880 | " | " | " | — |
| 31 | " | " | — | — | — | Al₂O₃ | 5 | " | 1 | 5.26 | 1800 | " | " | " | — |
| 32 | " | " | — | — | — | " | " | " | 5 | 5.31 | 1880 | " | " | " | — |
| 33 | " | " | — | — | — | " | " | " | 10 | 5.20 | 1880 | " | " | " | — |
| 34 | 40 | — | 35 | 25 | — | " | " | 1900 | 15 | 5.12 | 1370 | 40 | 35 | 25 | — |
| 35 | " | — | " | " | — | " | " | 2000 | 1 | 5.26 | 1830 | " | " | " | — |
| 36 | " | — | " | " | — | " | " | 2100 | 15 | 5.30 | 1970 | " | " | " | — |
| 37 | " | — | " | " | — | " | " | " | " | 5.30 | 1970 | " | " | 41 | — |
| 38 | 50 | 30 | — | — | TiN(20) | WR | — | 1900 | " | 5.25 | 1920 | 42.6 | 34.3 | 23.1 | 20 TiN |
| 39 | 59.7 | 39.8 | — | — | C(0.5) | Al₂O₃ | " | 2000 | " | 5.19 | 1780 | 38.8 | 36.6 | 24.6 | 0.5 C |
| 40 | 59.0 | 39.4 | — | — | C(0.5) Si(1.1) | " | " | " | " | 5.09 | 1924 | 38.7 | 36.6 | 24.7 | 1.6 Si+ |
| 41 | 59 | 39 | — | — | Al₂O₃(2) | " | " | 1900 | " | 5.20 | 1760 | 39.1 | 36.4 | 24.5 | 2 Al₂O₃ |
| 42 | 57 | 38 | — | — | Al₂O₃(5) | " | " | " | " | 5.21 | 1880 | 38.7 | 36.6 | 24.6 | 5 Al₂O₃ |
| 43 | 40 | — | 35 | 25 | — | " | " | 2200 | " | 5.01 | 1792 | 40 | 35 | 25 | — |
| 44 | 70 | — | 18 | 12 | — | " | " | " | " | 4.89 | 1704 | 70 | 18 | 12 | — |
| 45 | 80 | 20 | — | — | — | " | " | 2300 | " | 5.03 | 1970 | " | " | " | — |
| 46 | 70 | — | 18 | 12 | — | " | " | " | " | 4.93 | 1740 | " | " | " | — |

*Calculated from starting compositions

TABLE 6

GRINDING RESULTS
Average Values

| No. | Grain Size U.S. Stand. Mesh | Wheel Diameter (inches) | Profile (microinches) | Finish (microinches) | $A_w 10^5$ (cu.in/min.lb.in.) | Grinding Ratio |
|---|---|---|---|---|---|---|
| 19 | 80/100 | 1¼ | 52 | 30 | 45 | 1341 |
| 20 | " | " | 70 | 10 | 44 | 1089 |
| 21 | " | 1¾ | 210 | 10 | 56 | 1309 |
| 22 | 140/170 | " | 89 | 7 | 106 | 1280 |
| 23 | 80/100 | " | 142 | 9 | 120 | 884 |
| 24 | " | " | 144 | 8 | 40 | 1822 |
| 25 | 140/170 | " | 45 | 4 | 110 | 1742 |
| 26 | 80/100 | 1¼ | 53 | 11 | 106 | 478 |
| 27 | 140/170 | 1¼ | 92 | 6 | 113 | 1211 |
| 28 | 80/100 | 1¾ | 77 | 9 | 40 | 1158 |
| 29 | " | " | 112 | 5 | 192 | 1149 |
| 30 | " | 1¼ | 85 | 11 | 42 | 908 |
| 31 | " | 1¾ | 82 | 10 | 94 | 1622 |
| 32 | " | " | 102 | 8 | 57 | 1250 |
| 33 | " | " | 85 | 5 | 151 | 1263 |
| 34 | " | 1¼ | 82 | 11 | 64 | 1101 |
| 35 | " | 1¾ | 95 | 7 | 72 | 1593 |
| 36 | " | " | 66 | 6 | 100 | 1548 |
| 37 | 140/170 | " | 47 | 6 | 76 | 2460 |
| 38 | 80/100 | 1¼ | 81 | 8 | 85 | 1130 |
| 39 | " | 1¾ | 101 | 11 | 72 | 1994 |
| 40 | " | " | 119 | 11 | 61 | 1427 |
| 41 | " | 1¼ | 67 | 9 | 50 | 1350 |
| 42 | " | 1¾ | 115 | 9 | 72 | 1426 |
| Control K | 80/100 | 1¼ | 84 | 12 | 260 | 780 |
| Control L | " | 1¼ | 103 | 13 | 250 | 529 |
| Control M | " | 1¾ | 114 | 8 | 210 | 555 |
| Control N | " | 1.35 | 51 | 14 | 190 | 2435 |
| 43 | 140/170 | 1¼ | 114 | 5 | 245 | 456 |
| 44 | " | " | 98 | 7 | 340 | 750 |
| 45 | " | " | 111 | 6 | 287 | 932 |
| 46 | " | " | 128 | 7 | 285 | 805 |

What is claimed is:

1. Abrasive particles consisting essentially of from 69% to 94% by weight of a carbide matrix of titanium and zirconium carbide, and from 6% to 31% by weight of crystalline titanium diboride grains dispersed throughout said carbide matrix, said carbide matrix being at least partially in the form of one or more solid solutions of zirconium carbide and titanium carbide with proviso that said zirconium carbide is present in an amount of from 10% to 46% by weight, based on the total weight of the titanium and zirconium carbides and borides present.

2. Abrasive particles according to claim 1 wherein said carbide matrix is present in an amount from 75% to 90% by weight of the titanium and zirconium carbides and borides present and said crystalline titanium diboride is present in an amount of from 10% to 25% by weight.

3. Abrasive particles according to claim 1 wherein said zirconium carbide is present in an amount from 15% to 40% by weight of the titanium and zirconium carbides and borides present.

4. Abrasive particles according to claim 2 wherein said zirconium carbide is present in an amount of from 15% to 40% by weight of the titanium and zirconium carbides and borides present.

5. Abrasive particles according to claim 1 wherein said titanium diboride is present as grains of 0.5 to 30μm.

6. Abrasive particles according to claim 1 wherein said carbide matrix is present as grains of 2 to 30μm.

7. Abrasive particles according to claim 1 wherein the size of said abrasive particles is from −20 to +400 mesh.

8. Abrasive particles according to claim 1 wherein the apparent density of said abrasive particles is 4.8 to 5.3 g/cc.

9. Process for preparing the abrasive particles of claim 1 by the steps by
   (1) thoroughly mixing zirconium diboride and titanium carbide each predominately 1–100 μm. in maximum dimension, said titanium carbide being present in an amount in excess of the stoichiometric amount required to react with the total amount of zirconium diboride present,
   (2) hot-pressing the mixture of step (1) from 1 to 60 minutes at a temperature from 1900° C. to 2400° C. and at a pressure of at least 2000 psi to form a hot-pressed compact, and
   (3) crushing said hot-pressed compact of step (2) to form abrasive particles.

10. Process according to claim 9 wherein said mixture of step (1) is milled from 1 to 12 hours and hot-pressed from 5 to 15 minutes at a temperature from 1900° C. to 2200° C. and a pressure of at least 2000 psi.

11. Process according to claim 9 wherein said mixture of step (1) is milled from 1 to 6 hours and hot-pressed for 15 minutes at 2000° C. and 4000 psi.

12. Process according to claim 9 wherein the mixture employed in step (1) consists essentially of predetermined amounts of titanium carbide, zirconium carbide and titanium diboride.

13. In an abrasive device containing a support, bonding agent and abrasive particles, the improvement comprising using particles of the composition of claim 1.

14. The grinding wheel comprising a bond, a filler and the abrasive particles of claim 1.

* * * * *